July 12, 1955     P. A. ARGENTIERI ET AL     2,712,786
FLEXIBLE DAMPER CONSTRUCTION FOR DIFFUSERS AND THE LIKE
Filed Jan. 11, 1952     2 Sheets-Sheet 1

INVENTORS
BY Peter A. Argentieri
Thomas L. Day
Eric Y. Munson
ATTORNEY

United States Patent Office 2,712,786
Patented July 12, 1955

2,712,786

FLEXIBLE DAMPER CONSTRUCTION FOR DIFFUSERS AND THE LIKE

Peter A. Argentieri and Thomas L. Day, Danbury, Conn.

Application January 11, 1952, Serial No. 265,968

5 Claims. (Cl. 98—40)

This invention relates to improvements in air outlet devices or diffusers for air conditioning systems, examples of such devices being found in co-pending applications Serial No. 123,927, filed October 27, 1949, now U. S. Patent No. 2,644,389, and Serial No. 186,154, filed September 22, 1950, now U. S. Patent No. 2,687,746.

As stated in said applications, it is desirable to provide, in devices of this character, and particularly when the air ducts employed are of relatively small diameter, means by which noise conditions are materially reduced and to an extent where the noise is relatively negligible.

In the air conditioning of large buildings, the employment of relatively small sized supply ducts with high velocities and consequent high static pressure losses is favored in order to conserve space and initial cost. It has been found that to maintain uniform outlet capacity throughout a system, the outlets closer to the fan must be throttled to absorb excess static pressure in the range above 1" water gauge. Ordinary dampers operating against these differential pressures would invariably be noisy and consequently objectionable, and the present invention contemplates the provision of a throttling structure which will operate without producing objectionable noise.

It is therefore an object of the present invention to provide a throttling device of the character described which can be built into an air outlet and be readily accessible for adjustment. It is another object of the invention to provide a device of this kind which will provide for a substantial amount of throttling without producing objectionable noise, and which will result in breaking up the air stream into a multiplicity of small streams which quickly merge at reduced velocity after having passed through the throttling device.

These and other objects to be hereinafter set forth, are attained by the invention to be described in the following specification and more particularly pointed out in the claims appended hereto.

In the accompanying drawing, wherein an illustrative embodiment of the invention is disclosed, Fig. 1 is a vertical sectional view through an air outlet diffuser in which the improved air throttling device is incorporated;

Figure 1:
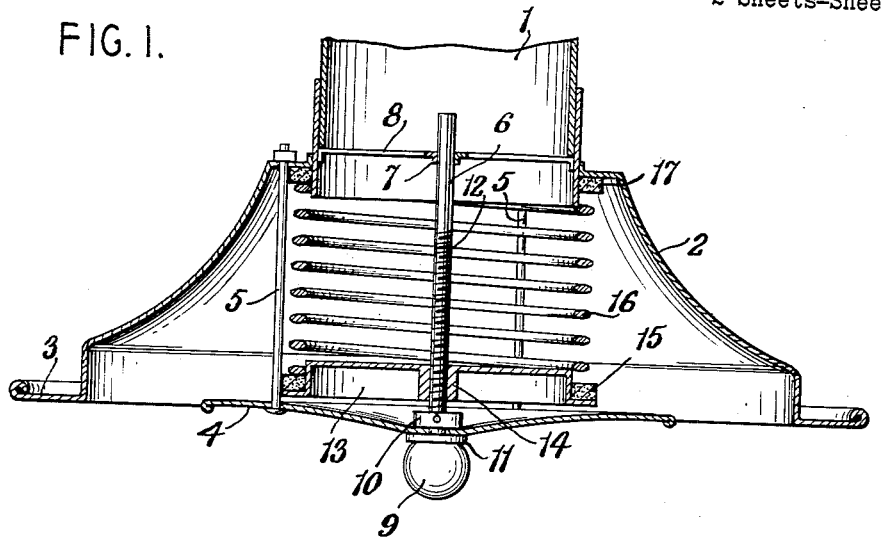
Figure 2:
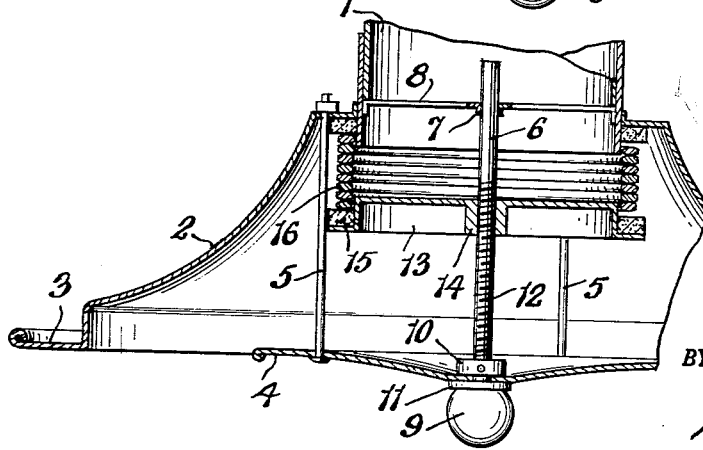
Fig. 2 is a similar sectional view, showing the helical or spring element fully compressed to completely close the air outlet.

Referring to the structure shown in Figs. 1 and 2, the air passage or air conduit is indicated at 1, and through which the air under pressure is forced to the air outlet device. Secured to the end of the passage 1 is the air outlet housing comprising a shell 2 of substantially conical shape, provided with a radial flange 3 fitting against the ceiling or wall in which the outlet is situated, and a deflector plate 4 positioned in the outlet end of shell 2 and maintained in fixed position by adjustable spacing in relation to shell 2 by means of the bolts 5 so as to define an outlet opening 1.

Located centrally and axially of the passage 1 and the attached housing 2, is a threaded adjusting pin 6, which has one unthreaded end portion freely rotatable in a boss 7 provided on a spider 8 fixed within the end portion of the air passage 1. At its opposite end, the pin 6 is provided with a knob or ball 9 which may be readily grasped in the fingers to thereby rotate the pin 6 to adjust the throttling device in a manner to be described. The pin 6 passes through a central aperture in the deflector plate 4, in which it is freely rotatable, and is maintained from axial displacement out of the diffuser plate 4 by means of a collar 10 secured on the pin 6 and the washer portion 11 on the knob or ball 9.

Threadably mounted on the threaded portion 12 of the adjusting pin 6 is a disk-shaped adjustment plate 13 provided with a centrally-located boss 14 which is internally threaded to receive the threads 12 of the pin 6. The plate 13 is of a diameter at least equal to the end of the air passage 1. Adjacent to its periphery, the adjustment plate or disk 13 is provided with an annular gasket 15 of soft and compressible material such as felt or the like, against which is seated one end of a helical member in the form of a coil spring 16. Said coil spring normally has its convolutions spaced apart to thereby provide air passages between them. The throttling effect is obtained by varying the spacing between the convolutions of the spring, such variation being secured by moving the adjustment plate 13 to or from the end of the air passage 1.

The spring 16 has its upper end encircling the end of the air passage 1 and provided around said end of the air passage and located with the housing 2 is an upper seat for the reception of the upper end of the spring 16. Said upper seat includes a gasket or annular 17 of felt or similar compressible material.

From the foregoing, the operation of the improved throttling device will be readily understood. By manual rotation of the adjusting pin 6 attained by rotating the knob 9, it will be noted that the disk-shaped adjustment plate 13 will be moved to or from the end of the air passage 1 and will, by such movements, either compress the spring 16 or permit of its expansion to thereby vary the spacing between the convolutions of the spring and thus regulate the throttling effect on the air flow from the end of the passage 1. The frictional contact of the opposite ends of the spring 16 against the respective seat surfaces 15 and 17 will be found sufficient to prevent rotative movement of the spring and the disk-shaped adjustment plate 13, but if necessary, the ends of the spring 16 may be fastened to the respective seats to prevent such rotative movement.

The spring or helical element 16 is shown to be composed of stock substantially oval in cross-sectional shape, but it will be apparent that it may be made in other shapes, such as round, square or rectangular or other shape to secure various effects. While it is expected that the throttling effect desired with devices of this character will call for only a net capacity of 50% of normal capacity, a complete closure of the outlet may be obtained as shown in Fig. 2. It will be therein noted that the adjustment plate 13 has been brought toward the outlet end of the air passage 1 to an extent to cause the various convolutions of the spring to be brought into contact and thus form the spring into a tubular enclosure between the outlet end of the passage 1 and the disk-shaped adjustment plate 13. If it is contemplated that the outlet will require such a complete closure, the coils of the spring can be coated with a resilient material constituting a seal between them when they are brought into close contact as shown in Fig. 2.

Figure 3:
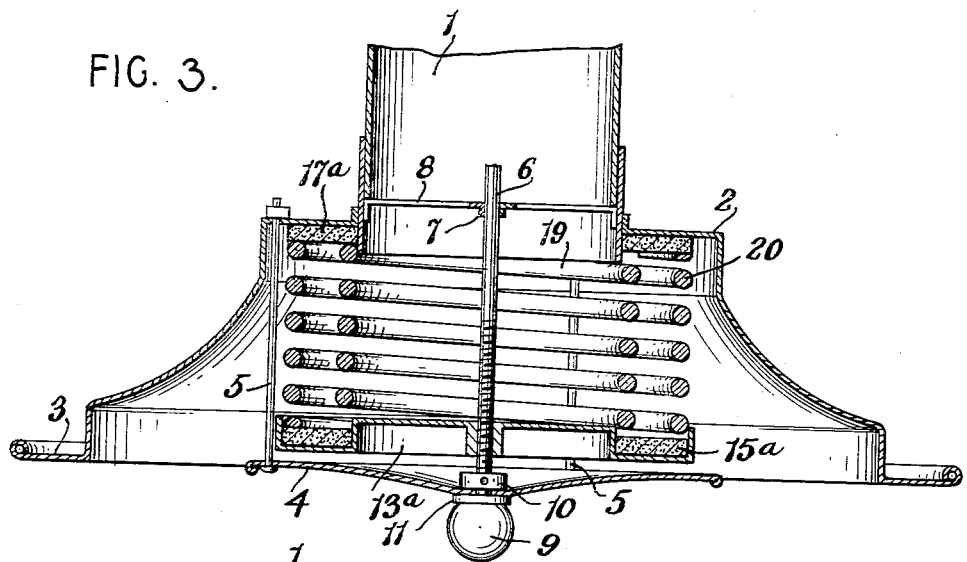
Fig. 3 is a similar sectional view of a modified construction employing two concentrically arranged helical elements or springs.

In the embodiment of the invention shown in Fig. 3, the adjustment plate 13a is similar to that shown at 13 in Figs. 1 and 2 except that it is provided adjacent to its periphery with a wider spring-seating surface for the reception of the gasket 15a. A pair of concentrically-arranged springs 19 and 20 is arranged to rest against the gasket 15a, which springs have their upper ends resting against the upper seating surface 17a. This construction is substantially similar in all other respects to that described in respect to Figs. 1 and 2, except that because of the arrangement of the two concentric springs, a two-stage throttling effect is attained particularly when one spring has more convolutions than the other. It will be apparent that instead of two concentrically-arranged springs, an additional number might be employed without departing from the spirit of the invention.

Figure 4:
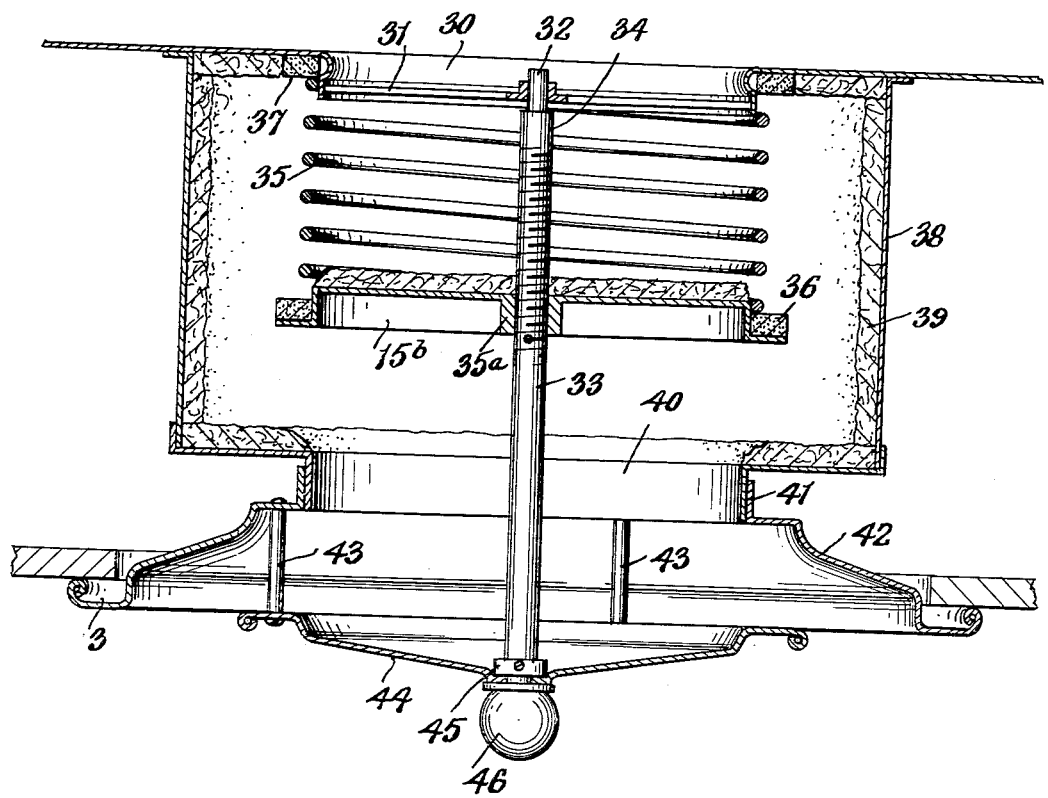
Fig. 4 is another modification of the invention in which the throttling device is located within a housing.

In the embodiment of the invention shown in Fig. 4, the air-inlet opening is indicated at 30, and the same holds a spider 31 in which the reduced end 32 of an adjusting pin 33 is freely rotative. The threaded portion 34 of the pin 33 extends through the threaded boss 35a of the disk-shaped adjustment plate 15b. A coil spring 35 surrounds the pin 33 and has its lower end resting against the gasket 36 on the seat 15b. The opposite or upper end of the spring 35 rests against the gasket 37 extending around the inlet opening 30. The throttling device of this embodiment is enclosed in a housing 38 which is lined with a layer of sound-absorbing material 39 to minimize noise and vibration due to air impact. Said housing 38 is provided with an air outlet 40 in the form of an annular flange to which the top flange 41 of the shell or cone 42 is attached. Screws 43 attach the deflector plate 44 to the shell 42 and in the required spaced relation to the same, and the adjusting pin 33 is freely rotative through a central opening in the plate 44 and is held from axial movement by means of the collar 45 and operating knob 46.

It will be apparent from the foregoing, that we have provided a throttling device in which the passage of air is readily controlled to the required extent by the mere adjustment of the helical element or elements located between a closure plate or spring seat and the air opening leading to the diffuser. It will be additionally clear that the convolutions of the helical element or elements will tend to break up the air stream into a number of streams which will merge at reduced velocity after passing through the throttling device, to then pass out of the diffuser. The arrangement of parts of the throttling device is such that noise is reduced to a minimum and to an extent to be inconsequential.

This helical damper member also has solved the dust problems usually associated with high velocity or high pressure diffuser systems. It has been found, namely, that the dust which is usually carried by the air stream sometimes clogs the perforations of the damping device disclosed in the aforesaid co-pending applications. The cleaning of these perforate dampers presents a difficult problem whereas in the present invention the dust can be removed simply by expanding and contracting the helical spring.

Having described several embodiments of the invention, it is obvious that the same is not to be restricted thereto but is broad enough to cover all structures coming within the scope of the annexed claims.

What is claimed is:

1. An air outlet device for connection to the opening of an air supply duct comprising a housing surrounding said opening and having an outlet opening, a disk in said housing, means for supporting the disk spaced from the opening, a plurality of concentrically arranged resilient helical members interposed between the disk and opening, one end of each of said helical members surrounding the opening and resting against a portion of the housing around the opening, means for adjusting the disk toward or away from the opening, whereby adjusting movement of the disk toward the opening will adjust the helical members and lessen the spacing between the convolutions thereof to thereby control the amount of air passing through said convolutions.

2. An air outlet device comprising an air outlet opening, a housing surrounding said opening, said housing being lined with sound-absorbing material, said housing having an outlet, a shell attached to said outlet, a deflector plate attached to said shell, an adjusting pin rotatively mounted in said deflector plate and extending through the shell and into the housing, means for freely rotatively supporting an end of said pin remote from the deflector plate, a spring seat threadably mounted on the pin and caused to be moved to or from the outlet opening by manual rotative movement of the pin, and a coil spring interposed between the spring seat and the outlet opening and caused to be compressed by movement of the spring seat toward the outlet opening to thereby vary the spacing between the convolutions of said coil spring and regulate the flow of air between said convolutions to reach the housing, the convolutions of the spring being all of similar diameter.

3. An air outlet device for connection to the opening of an air supply duct comprising, a housing surrounding said opening and having an outlet opening, a deflector plate spaced from the outlet opening, an adjusting pin plate spaced from the outlet opening, an adjustment rotatively mounted in the deflector plate, an adjustment plate constituting a damper located between the deflector plate and the outlet opening, a threadable connection between the adjusting pin and the adjustment plate to thereby enable said adjustment plate to be moved to or from the outlet opening by rotation of the pin, a flexible helical element having a plurality of convolutions of substantially uniform diameter and of a diameter greater than the diameter of the outlet opening surrounding said opening and having one end seated against the adjustment plate and adapted to be adjusted by movement of the plate toward the outlet opening to thereby vary the spacing between the convolutions of said helical member and regulate the lateral flow of air between said convolutions.

4. An air outlet device for connection to the opening of an air supply duct comprising a housing surrounding said opening and having an outlet, a throttling device in said housing consisting of a disk supported from the housing and movable to and from the outlet, a flexible spiral element having a plurality of closely-positioned like-diameter convolutions having one end surrounding the outlet and resting against a portion of the housing and the other end resting against the disk, said spiral element constituting a spiral-slotted cylindrical element of uniform diameter and of greater diameter than the outlet and being disposed between the outlet and the disk and having the spacing between its convolutions regulated by movement of the disk, and means for adjusting the disk toward or away from the outlet.

5. An air outlet device for connection to the opening of an air supply duct comprising, a housing surrounding said opening and having an outlet, a seat located in the housing and supported therefrom, said seat being adjustable axially of the opening, manually-rotatable adjustment means for moving the seat to or from the outlet opening, a flexible helical element located between the seat and the outlet and having a plurality of similar-diameter convolutions and adapted to have the spacing between its convolutions regulated to thereby control the air flow through the spacing of its convolutions, one end of the helical element resting against the seat and the opposite end thereof resting against a portion of the housing around the outlet, the diameter of the convolutions of the helical element being greater than the diameter of the outlet, the seat being capable of sufficient movement toward the outlet to enable the convolutions of the helical element to be brought together into close contact and thereby cause the helical element to form a tubular connection between the air supply opening and the seat and thus cause the seat to act as a closure for the outlet.

References Cited in the file of this patent

UNITED STATES PATENTS

| | | |
|---|---|---|
| 1,218,164 | Bicalky | Mar. 6, 1917 |
| 1,246,355 | Thomas | Nov. 13, 1917 |
| 1,380,567 | Knowles | June 7, 1921 |
| 1,926,778 | Kurth et al. | Sept. 12, 1933 |